United States Patent [19]

Torii et al.

[11] Patent Number: 5,762,579

[45] Date of Patent: Jun. 9, 1998

[54] POSITION DETECTOR FOR A MOVING BODY

[75] Inventors: Katsuhiko Torii, Hamana-gun; Kengo Yamamura, Kosai; Mitsuhiro Ikeya, Hamamatsu, all of Japan

[73] Assignee: Asmo Co., Ltd., Kosai, Japan

[21] Appl. No.: 775,946

[22] Filed: Jan. 3, 1997

[30] Foreign Application Priority Data

Mar. 27, 1996 [JP] Japan .................. 8-099425

[51] Int. Cl.$^6$ .................. G01D 5/02; G01P 3/02
[52] U.S. Cl. .................. 477/11
[58] Field of Search .................. 477/11, 12

[56] References Cited

U.S. PATENT DOCUMENTS

| | | | |
|---|---|---|---|
| 2,403,094 | 7/1946 | Lear | 477/11 |
| 2,547,475 | 4/1951 | Larsen | 477/11 |
| 3,321,992 | 5/1967 | Kawada | 477/11 |
| 4,938,327 | 7/1990 | Tominaga | 477/12 |

*Primary Examiner*—Dirk Wright
*Attorney, Agent, or Firm*—Burns, Doane, Swecker & Mathis, LLP

[57] ABSTRACT

In a position detector, a spring washer is beforehand attached integrally onto a carrier. Thus, when a planetary gear train unit composed of a sun gear, a ring gear and planetary gears is temporarily assembled, the center portions of the spring washer and a carrier are aligned each other accurately. Therefore, the axis of the spring washer cannot be misaligned from that of the carrier, the assembling performance is largely improved, and an accurate clutch holding force can be obtained. Alternatively, the spring washer may be attached integrally onto a cover plate.

9 Claims, 6 Drawing Sheets

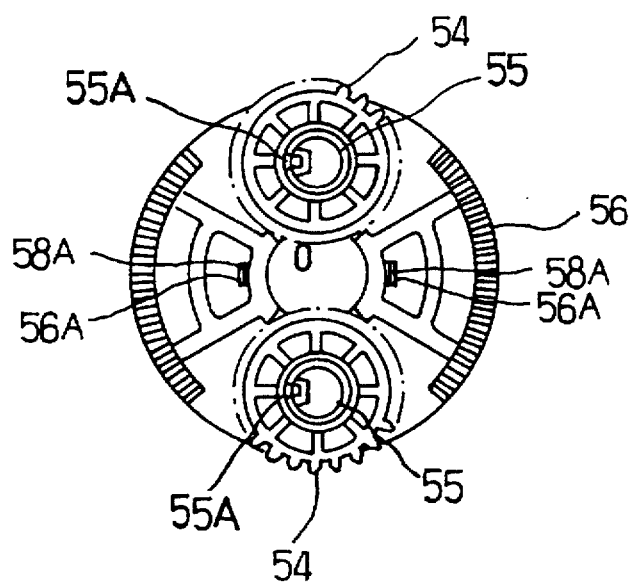
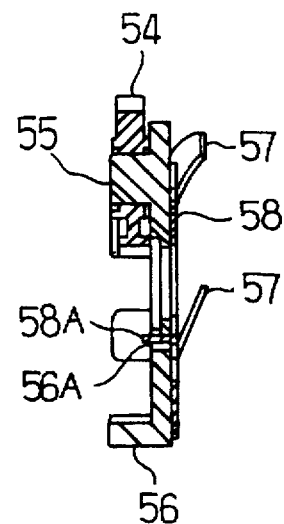
FIG. 5A   FIG. 5B
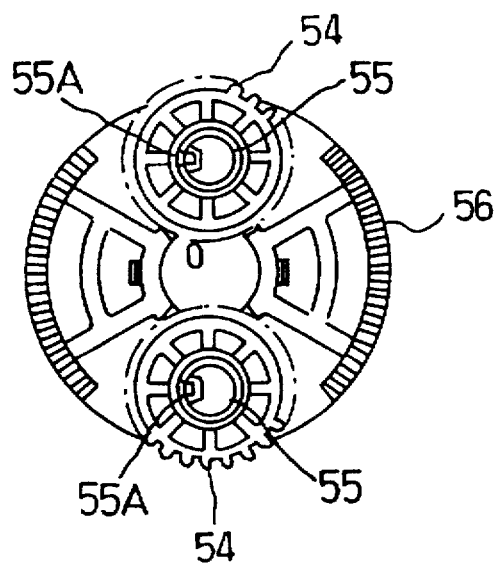
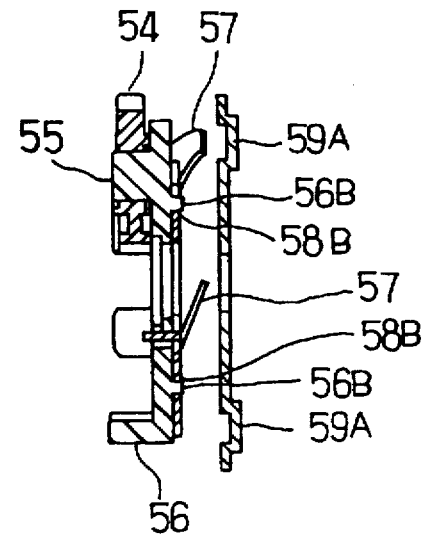
FIG. 6A   FIG. 6B

FIG. 7A    FIG. 7B   FIG. 7C
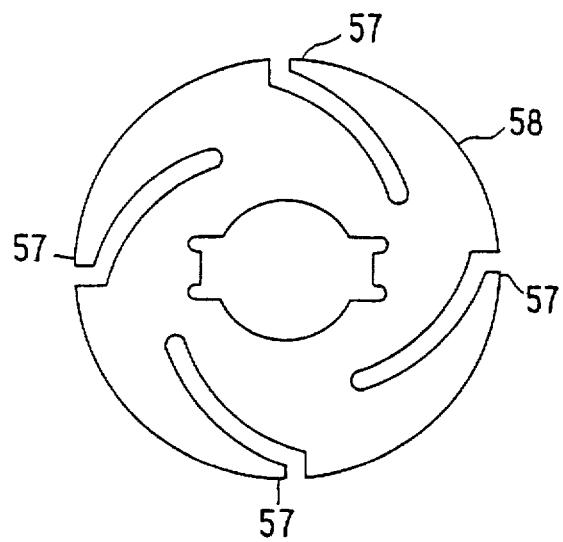
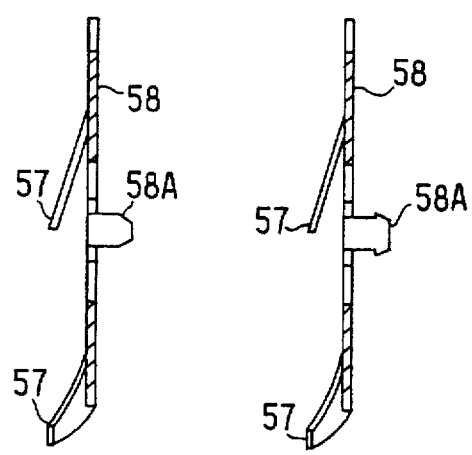
FIG. 8

POSITION DETECTOR FOR A MOVING BODY

CROSS-REFERENCE TO RELATED APPLICATION

This application is related to and claims priority from Japanese Patent Application No. 8-99425 filed on Mar. 27, 1996, the contents of which are hereby incorporated by reference.

BACKGROUND OF THE INVENTION

1. Field of the Invention

The present invention relates to a moving body position detector used for, e.g., a power window device that opens and closes a vehicle door window glass up and down or a sunroof device that opens and closes a sunroof door.

2. Description of Related Art

A motor is used as a driving source for a power window device that opens and closes a vehicle door window glass up and down or a sunroof device that opens and closes a sunroof door.

In power window devices, a catch prevention function is provided to prevent accidental catching of passenger's body and foreign objects between a window glass and a window frame. Among such power window devices equipped with the catch prevention function, some devices have a limit switch provided at a specified position in the door and determine whether or not any obstacle has been caught by the window glass based on a signal from the limit switch and a lock current of a motor, to control movement of the window glass, i.e., the rotation position of the motor. Other devices have a Hall IC or a special commutator for detecting rotation number of an armature and determine whether or not any obstacle has been caught based on a rotation number detection signal (pulse number or width of pulse signals) to control the rotation position of the motor.

However, in those power window devices (motor rotation position detection mechanism), cumbersome adjustment of assembling position is required when the motor and a window regulator is assembled, and cumbersome resetting after assembling work is also required. Further, when the catch prevention mechanism is provided, other additional expensive parts such as a control device is required but the accuracy is not improved so much.

In view of the foregoing problems, the applicant proposed a position detector for a moving body in U.S. Application No. 437876 filed on May 9, 1995 which corresponds to EPC Publication No. 0684452.

The proposed position detector for the moving body includes: a planetary gear train unit composed of a ring gear which is rotatably held in a cover plate and planetary gears engaged with the ring gear; a switch portion composed of a moving contact which is formed integrally with the ring gear to rotate with the ring gear and a fixed contact which is fixed on the cover plate to contact the moving contact; and a clutch mechanism which can shut off the transmission of the rotation force in the forward direction from the moving body (output shaft of the motor) to the ring gear. Thus, the position of the window glass or the sunroof door can be accurately detected and the movement thereof can be controlled when the position detector is applied to the power window device or the sunroof device. Further, the initial position can be set easily without cumbersome positional adjustment, and these effects can be realized by a simple mechanism and in low cost.

In the above-described position detector of the moving body, when the position detector is assembled, the cover plate is disposed at the bottom and the other parts are disposed on the cover plate in order. The parts such as the clutch mechanism, the ring gear and the planetary gears are assembled coaxially around a specified shaft corresponding to the moving body (output shaft) in order onto the cover plate. Further, after the assembling work, a carrier which rotatably holds the planetary gears and constitutes the planetary gear train unit is biased in an opposite direction relative to the cover plate by a spring washer constituting the clutch mechanism.

However, because the spring washer is not fixed in any place when the planetary gear train unit is temporarily assembled, the axis of the spring washer is likely to move from that of the carrier during assembling process of the clutch mechanism to the cover plate. As a result, the biasing force (pressing force) of the spring washer is not actually effected to the carrier, so that the stability of the clutch mechanism is deteriorated. Thus, to accurately assemble the spring washer coaxially with the specified axis on the cover plate, a careful work is required.

SUMMARY OF THE INVENTION

In view of the foregoing problems, it is an object of the present invention to provide a position detector for a moving body used for power window or sunroof devices, wherein the position of window glass or sunroof door can be detected accurately.

It is another object of the present invention to provide a position detector, wherein an initial position can be set without cumbersome adjustment, a simple structure can be obtained in a low cost, and a reliable holding force of a clutch is obtained with largely improving assembling performance.

According to one aspect of the present invention, in a position detector having a clutch mechanism operatively linked to a planetary gear train unit to stop a revolution of a planetary gears until a switch portion is actuated, a biasing device and a carrier are assembled integrally to rotatably hold the planetary gears. That is, when a cover plate is disposed at bottom and the planetary gear train unit and the clutch mechanism are assembled on the cover plate in order, the biasing device constituting the clutch mechanism and the carrier rotatably holding the planetary gear can be assembled together. Therefore, when the planetary gear train unit and clutch mechanism are temporarily assembled, the center of the biasing device is not misaligned from the center of the carrier. Thus, an accurate position is easily detected when the carrier is assembled, the assembling performance of the detector is largely improved, and an accurate clutch holding force can be obtained.

Preferably, the biasing device has an insertion protrusion and the insertion protrusion is inserted into an insertion hole formed in the carrier. Therefore, the biasing device and the carrier are assembled integrally so that the assembling performance is largely improved when temporarily assembled.

Alternatively, the carrier has an insertion protrusion and the insertion protrusion is inserted into an insertion hole formed in the biasing device. Therefore, the biasing device and the carrier are assembled integrally so that the assembling performance is largely improved when it temporarily assembled.

More preferably, the planetary gears are assembled integrally with the carrier so that the assembling performance is largely improved when temporarily assembled.

According to another aspect of the present invention, a biasing device constituting a clutch mechanism and a cover plate are integrally assembled with each other. That is, when the cover plate is disposed at bottom and a planetary gear train unit and the clutch mechanism are assembled on the cover plate in order, the biasing device is attached on a fixed position of the cover plate. Therefore, it is not necessary that the assembling position of the biasing device is adjusted especially. When the planetary gear train unit and clutch mechanism are temporarily assembled, the center of the biasing device is not misaligned from the center of the carrier. Thus, an accurate position is easily detected when the carrier is assembled, the assembling performance of the detector is largely improved, and an accurate clutch holding force can be obtained.

BRIEF DESCRIPTION OF THE DRAWINGS

Additional objects and advantages of the present invention will be more readily apparent from the following detailed description of preferred embodiments when taken together with the accompanying drawings, in which:

FIGS. 5A and 5B are a plan view and a sectional view illustrating planetary gears, a carrier and a spring washer of the position detector according to the first embodiment of the present invention;

FIGS. 6A and 6B are a plan view and a sectional view illustrating a modification of the planetary gears, the carrier, the washer and the spring washer of the position detector according to the first embodiment of the present invention;

FIGS. 7A–7C are a plan view and sectional views illustrating the spring washer of the position detector according to the first embodiment of the present invention;

FIG. 8 is a flow chart illustrating a control process when a window glass ascends by the operation of an ascent switch of the power window device to which the present invention is applied.

DETAILED DESCRIPTION OF THE PRESENTLY PREFERRED EMBODIMENTS

Preferred embodiments of the present invention will be described hereinafter with reference to the accompanying drawings.

Figure 1:
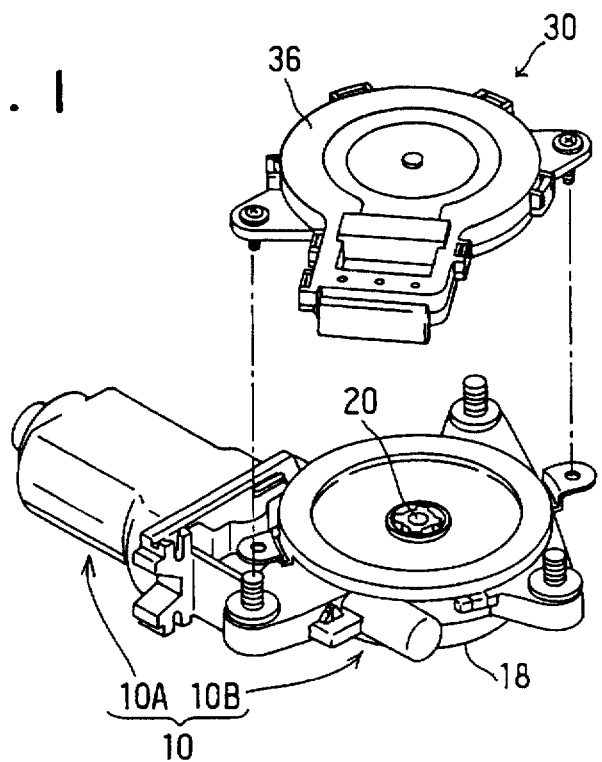
FIG. 1 is an overall perspective view of a motor for a power window device to which the first embodiment of the present invention is applied.
Figure 2:
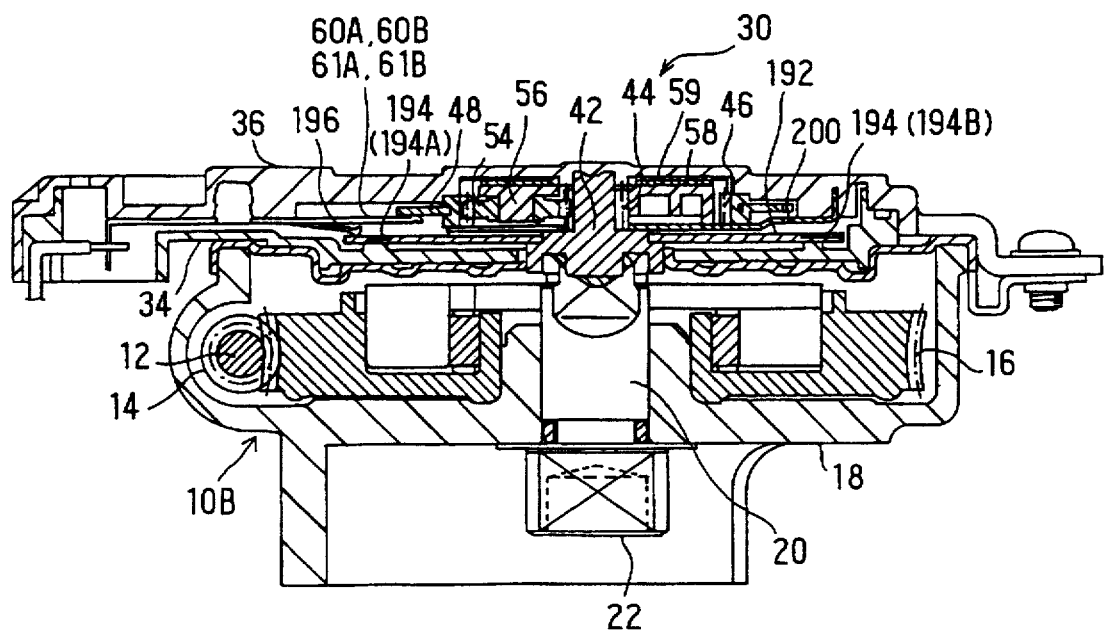
FIG. 2 is a cross-sectional view of the motor for the power window device to which the first embodiment of the present invention is applied.

As shown in FIGS. 1 and 2, a motor 10 is composed of a motor portion 10A and a gear portion 10B connected to the motor portion 10A. A rotation shaft 12 of the motor portion 10A extends into the gear portion 10B, and a worm gear 14 is formed at the top end thereof. The worm gear 14 engages with a rotation gear wheel 16 disposed in the gear portion 10B. In the rotation gear wheel 16, a shaft 20 as a motor output shaft is rotatably supported by a cover 18 of the gear portion 10B. Thus, when the motor portion 10A is operated and the rotation shaft 12 is rotated, the rotation force is transmitted to the rotation gear wheel 16 through the worm gear 14 so that the shaft 20 is rotated. An output fitting portion 22 is located at one axial end of the shaft 20, and is connected to a driving portion of a window regulator (not shown). In the first embodiment, it is so set that, when the shaft 20 (output fitting portion 22) rotates from 3 to 4.5 rotations, for example, the window glass moves 1 stroke.

The position detector 30 is attached on the side opposite to the output fitting portion 22 of the gear portion 10B.

Figure 3:
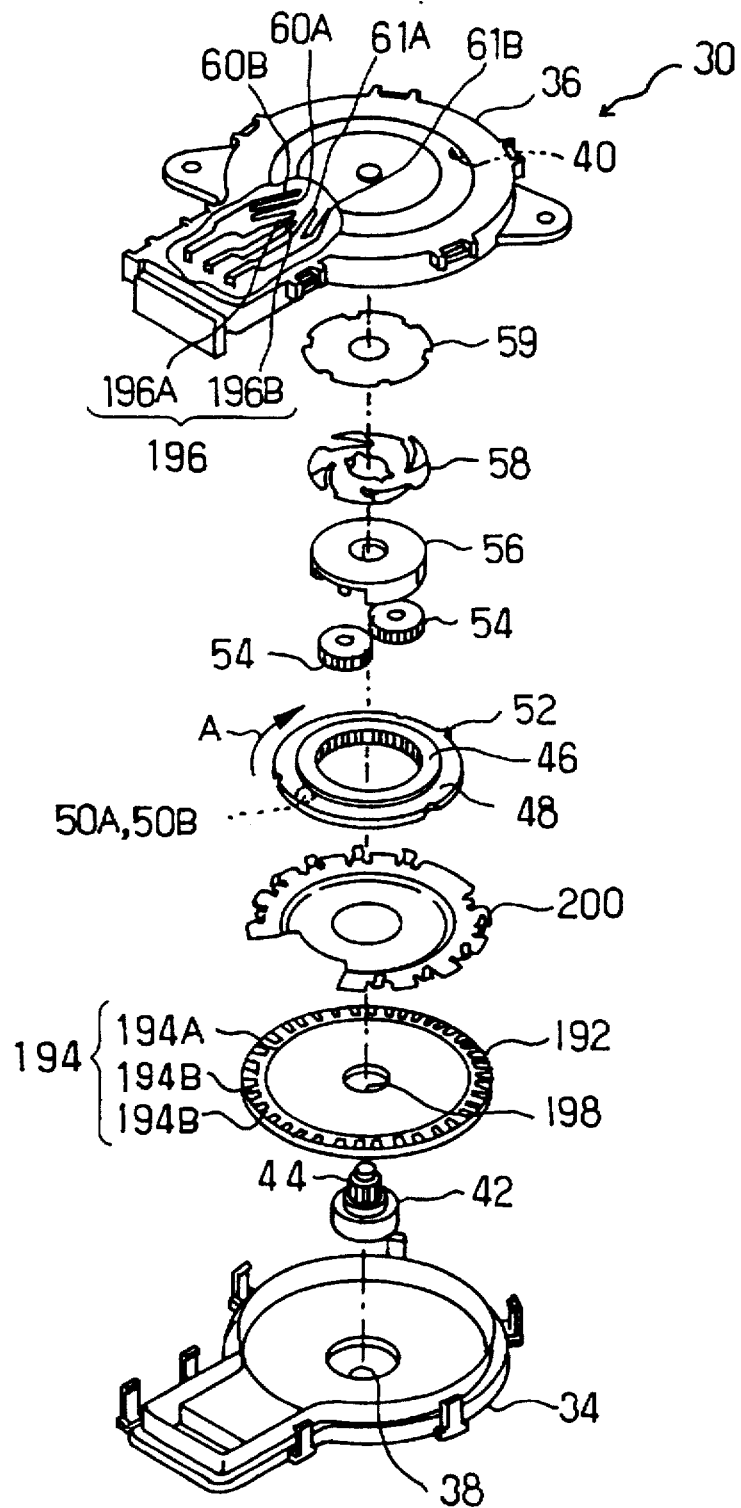
FIG. 3 is a perspective view of a position detector in a disassembled condition according to the first embodiment of the present invention.

As shown in detail in FIGS. 2 and 3, the position detector 30 is equipped with a base plate 34 and a cover plate 36 and is formed in an approximately cylindrical shape having a thin wall. A through hole 38 is formed in the center portion of the base plate 34, and a protrusion 40 is formed to extend in the axial direction on the inner peripheral surface of the cover plate 36.

Further, the position detector 30 is equipped with a connection shaft 42. One end of the connection shaft 42 is connected to the shaft 20 of the rotation gear wheel 16 to constantly rotate together with the shaft 20. The other end of the connection shaft 42 protrudes into the inside of the position detector 30 (base plate 34 and the cover plate 36) via the through hole 38 formed in the base plate 34. Further, a sun gear 44 constituting a part of planetary gear train unit is provided near the other end of the connection shaft 42, and engages with a pair of planetary gears 54.

At the periphery of the connection shaft 42, a ring gear 46 constituting a part of the planetary gear train unit is disposed to oppose the sun gear 44 radially. The ring gear 46 is rotatably held in the cover plate 36, and a flange portion 48 is formed integrally with the outer periphery of the ring gear 46. The flange portion 48 formed integrally with the ring gear 46 is a conductive plate and has moving contacts 50A and 50B formed on the opposite surface to the cover plate 36. The moving contacts 50A and 50B are non-conductive portions formed in arc shape having two steps, and are formed on the approximately same plane as the flange portion 48. Further, a protruding section 52 is formed on a portion of the periphery of the flange portion 48 to protrude radially outwardly therefrom. The protruding section 52 corresponds axially to the protrusion 40 formed on the cover plate 36, and is so configured that the protruding section 52 contacts the protrusion 40 at the time point when the ring gear 46 (flange portion 48) rotates in the forward direction (arrow A in FIG. 3) and arrives at the specified rotation position, and that further rotation of the ring gear 46 in the forward direction is stopped.

Figure 4:
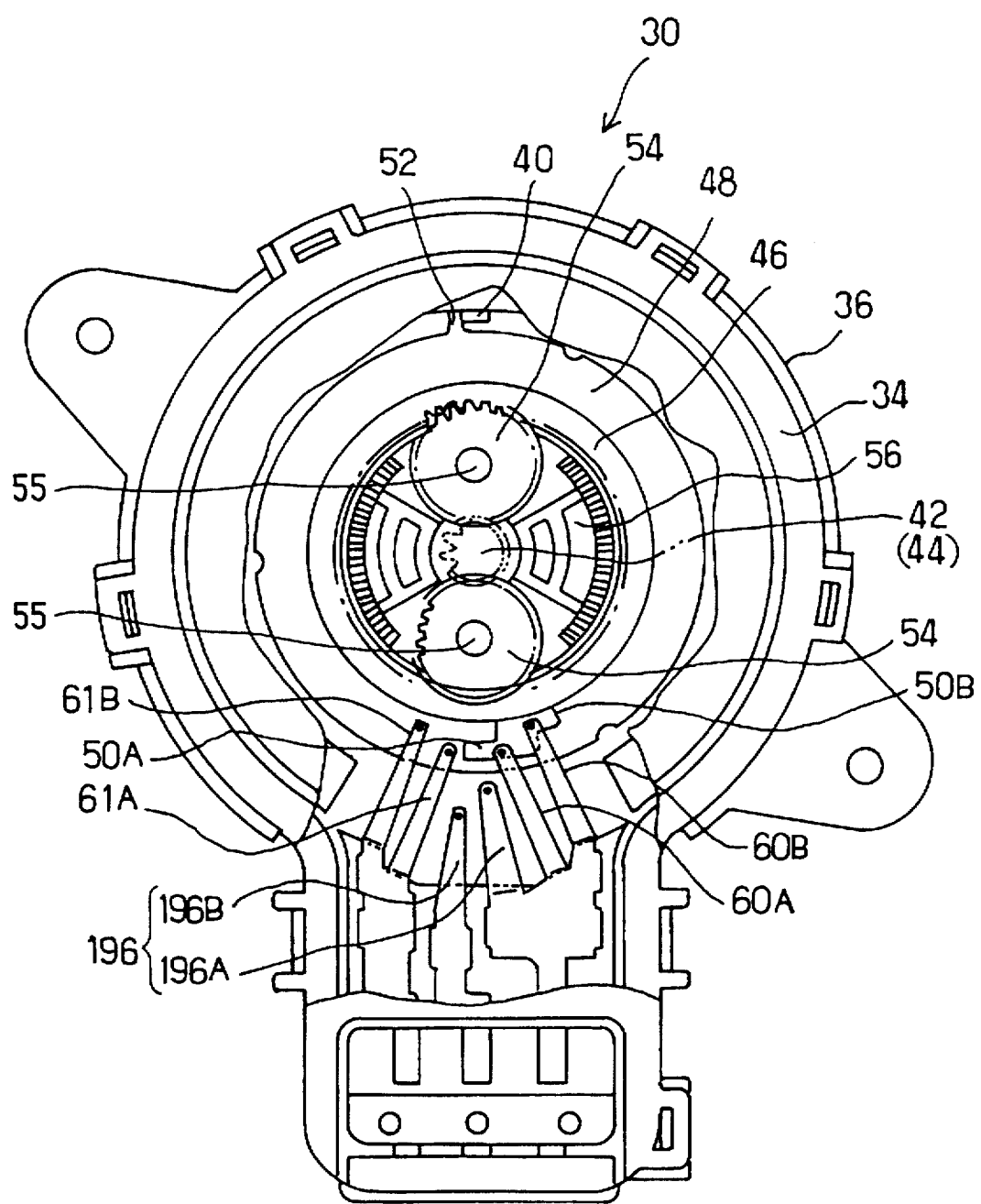
FIG. 4 is an enlarged view illustrating the corresponding relationship between a ring gear and a fixed contact of the position detector according to the first embodiment of the present invention.

In the internal perimeter portion of the ring gear 46, two planetary gears 54 are disposed to revolve around the sun gear 44. As shown in FIGS. 4 and 5A–5B, these planetary gears 54 are rotatably supported by respective supporting shafts 55 located in a carrier 56. An engagement claw 55A which can be elastically deformed is located at the top end of the supporting shaft 55. The engagement claw 55A is elastically deformed by attaching the planetary gears 54 to the supporting shaft 55, and the engagement claw 55A returns to the original position when the planetary gears 54 are inserted into a specified position, so that the planetary gears 54 are not separated from the supporting shaft 55. The planetary gears 54 are engaged with the ring gear 46 and the sun gear 44. That is, the sun gear 44, the ring gear 46 and the planetary gears 54 constitute the planetary gear train unit, which transmits the rotation of the connection shaft 42 (that is, shaft 20) through speed reduction. For example, when the revolution of the planetary gears 54 are stopped while the carrier 56 is maintained and fixed, the rotation of the connection shaft 42 (that is, shaft 20) can be decelerated and transmitted to the ring gear 46.

In the first embodiment, the deceleration or speed reduction ratio of the planetary gear train unit composed of the sun gear 44, the ring gear 46 and the planetary gears 54 is 5.2:1, and the unit is so set that the ring gear 46 will not rotate for more than one rotation while a window glass make one stroke (while the sun gear 44 makes 3 to 4.5 rotations). The deceleration ratio of the planetary gear train unit is not limited to 5.2:1, however can be set to an arbitrary value as desired.

As shown in FIG. 3, the planetary gear train unit composed of the sun gear 44, the ring gear 46 and the planetary gears 54 is covered by the cover plate 36 and is held on a protective plate 200, so that it prevent the planetary gear train unit from being separated from the cover plate 36. A spring washer 58 has raised claw portions 57 as shown in FIG. 7A, and the spring washer 58 and a washer 59 constituting a clutch mechanism are disposed between the cover plate 36 and the carrier 56. As shown in FIGS. 5A and 5B, an insertion protrusion 58A is formed on the spring washer 58, and an insertion hole 56A is formed in the carrier 56. The insertion protrusion 58A of the spring washer 58 is inserted into the insertion hole 56A of the carrier 56, so that the spring washer 58 is attached integrally to the carrier 56. Because the spring washer 58 is accurately assembled at the rotation center of the carrier 56, the pressing or baring force of the spring washer 58 operates uniformly to the rotation center of the carrier 56 so that the maintaining force of the clutch mechanism is made stable. The angles of the top end of the insertion protrusion 58A may be chamfered as shown in FIG. 7B, or may be formed to have an engaged engagement portion as shown in FIG. 7C. Further, the washer 59 is pressed integrally onto the inner surface of the cover plate 36, and the spring washer 58 contacts this washer 59 in a compressed state. Thus, the spring washer 58 constantly presses the carrier 56 so that the carrier 56 contacts the protective plate 200. Therefore, normally, the rotation of the carrier 56 is stopped by the pressing force of the spring washer 58 (i.e., by the frictional force between the carrier 56 and the protective plate 200, and the frictional force between the spring washer 58 and the washer 59), and the revolution of the planetary gears 54 around the sun gear 44 is stopped. On the other hand, when the protruding section 52 of the flange portion 48 of the ring gear 46 contacts the protrusion 40 and the further rotation of the ring gear 46 in the forward direction A is stopped, the forward direction rotation force of the sun gear 44 surpassing the pressing force (maintaining force) of the carrier 56 acts so that the spring washer 58 releases the maintenance of the carrier 56 and the planetary gears 54 can perform the revolution around the sun gear 44. That is, after the protruding section 52 of the flange portion 48 contacts the protrusion 40, the spring washer 58 can shut off the transmission of the forward direction rotation force from the sun gear 44 (shaft 20) to the ring gear 46. Thus, in the case wherein the protruding section 52 contacts the protrusion 40 so that the rotation of the ring gear 46 is stopped, when the sun gear 44 (shaft 20) rotates in the forward direction (the direction to rotate the ring gear 46 in the forward direction A), only the planetary gears 54 revolve to rotate the carrier 56 against the biasing force of the spring washer 58.

In the first embodiment, as shown in FIGS. 5A–5B, the insertion protrusion 58A is formed on the spring washer 58 and this insertion protrusion 58A is inserted into the insertion hole 56A formed in the carrier 56 so that the spring washer 58 is assembled integrally with the carrier 56. Alternatively, however, as shown in FIGS. 6A and 6B, the insertion hole 58B may be formed in the spring washer 58 and the insertion protrusion 56B of the carrier 56 may be inserted into the insertion hole 58B so that the spring washer 58 may be assembled integrally with the carrier 56.

As shown in FIG. 6B, a circular recess portion 59A is formed in the washer 59, and the raised claw portion 57 of the spring washer 58 is engaged with the recess portion 59A, so that the position of the radial direction of the spring washer 58 can be accurately determined by this engagement.

Referring to FIG. 3 again, a pair of fixed contacts 60A and 61A and another pair of fixed contacts 60B and 61B are attached onto the cover plate 36. Each pair of the fixed contacts 60A and 61A and the fixed contacts 60B and 61B are made of contact-plates having elasticity and electric conductivity. The fixed contact 60A is formed integrally with the fixed contact 60B, and the fixed contact 61A is formed integrally with the fixed contact 61B. One end of each pair of the fixed contacts 60A and 61A and the fixed contacts 60B and 61B is fixed to the cover plate 36 and each top end thereof extends toward the flange portion 48 of the ring gear 46 so as to elastically contact the flange portion 48 (the side surface opposite to the cover plate 36). The fixed contacts 60A and 61A and the fixed contacts 60B and 61B are pressed to the flange portion 48 having the moving contacts 50A and 50B of the ring gear 46 from the side opposite to the cover plate 36.

The fixed contacts 60A and 61A and the fixed contacts 60B and 61B contact the non-conductive moving contacts 50A and 50B at the specified rotation position of the ring gear 46. As shown in FIG. 4, the fixed contacts 60A and 61A are positioned to contact the radially outside moving contact 50A, while the fixed contacts 60B and 61B are positioned to contact the radially inside moving contact 50B.

Further, the fixed contacts 60A and 61A and the fixed contacts 60B and 61B are electrically connected to a control circuit (not shown) of the power window device, and the moving contacts 50A and 50B contact together the fixed contacts 60A and 60B to be in a non-conducting state, so that the rotation position of the ring gear 46, that is, the rotation position of the sun gear 44 or the shaft 20 can be detected. The contacts 60A and 60B are used in the rotation control of the motor 10 described later.

The first embodiment is so designed that, for example, at the point when the window glass moves to 4 mm below the upper stop position, the protruding section 52 reaches a specified rotation angle position displaced from the position which is attained when the protruding section 52 contacts the protrusion 40, and at this point, the moving contacts 50A and 50B contact the fixed contacts 60A and 60B to be become non-conducting. Further, the non-conducting state can be maintained until the protruding section 52 contacts the protrusion 40.

Alternatively, it may be so designed that when the window glass moves to 4 mm below the upper stop position and the protruding section 52 reaches the specified angle position from the rotation angle which is attained when the protruding section 52 contacts the protrusion 40, the moving contacts 50A and 50B contact together the fixed contacts 60A and 61A and the fixed contacts 60B and 61B to become the conducting, so that the position detection may be performed. Further, after the conduction state or the non-conduction state is achieved as described above, it is not always necessary to electrically maintain such conduction state and non-conduction state. By detecting a trigger signal generated from the contact between the moving contacts 50 A and 50B and each pair of the fixed contacts 60A and 61A and the fixed contacts 60B and 61B, it can be determined that the protruding section 52 reaches a specified rotation position.

Further, as shown in FIG. 3, the position detector 30 includes a pulse plate 192 as pulse generation means and a sliding contact 196 as pulse detection means.

The pulse plate 192 is formed in a thin circular shape, and a fitting hole 198 formed in the central portion of the pulse plate 192 is pressed into the connection shaft 42 so as to rotate together. Thus, the pulse plate 192 constantly rotates with the connection shaft 42. Further, a conduction portion 194 is formed on the pulse plate 192. The conduction portion 194 is formed along the perimeter direction of the pulse plate 192 in the periphery, and includes a ring-shaped first conduction portion 194A and a second conduction portion 194B which is adjacent to the first conduction portion 194A and has a continued pulse-shaped notches.

On the other hand, the base portion of the sliding contact 196 is fixed to the cover plate 36 and extends toward the conduction portion 194 of the pulse plate 192, and the sliding contact 196 is composed of an input contact 196A constantly contacting the first conduction portion 194A of the conduction portion 194 and an output contact 196B contacting the second conduction portion 194B of the conduction portion 194. Thus, the pulse signal can be detected as the pulse plate 192 rotates. The detected pulse signal is used in the move position control of a moving body (the window glass).

The conduction portion 194 may be formed on the side wall of the periphery of the pulse plate 192 instead of the upper surface thereof. In this case, the sliding contact 196 is fixed to the cover plate 36 to face the side peripheral wall of the pulse plate 192.

Further, the protective plate 200 is disposed between the pulse plate 192 and the ring gear 46 (the flange portion 48). The periphery of the protective plate 200 is held and fixed to the cover plate 36 and holds the ring gear 46, the carrier 56 and the like so as to prevent the separation from the cover plate 36. Further, because the protective plate 200 is interposed between the pulse plate 192 and the ring gear 46 (flange portion 48), the protective plate 200 limits the movements of the pulse plate 192 and the ring gear 46 so as not to contact the two parts with each other.

The operation of the first embodiment is described with reference to the flowchart shown in FIG. 8 with respect to the case in which the window glass moves upward in response to the operation of an ascent switch of the power window device, for example.

In the motor 10 and the position detector 30 described above, when the operation of the ascent switch of the power window device is detected at a step 201, the motor 10 is driven to rotate the shaft 20 at a step 202 so that the window regulator is actuated and the window glass is raised.

Normally (while the window glass is ascending), the carrier 56 is pressed by the spring washer 58 and held stationary, so that the revolution of the planetary gears 54 around the sun gear 44 is stopped. Thus, with the rotation of the shaft 20, the rotation force of the connection shaft 42 (that is, the sun gear 44) is decelerated through the planetary gears 54 which rotates around the shafts 55 and is transmitted to the ring gear 46. Thus, the ring gear 46 gradually starts rotating in the forward direction A.

Next, at a step 204, whether or not the motor 10 reaches a specified rotation position, that is, whether or not the window glass reaches a specified position (4 mm below the upper stop position) is detected by the signal from the position detector 30.

That is, in the position detector 30, with the rotation of the shaft 20, the rotation force of the connection shaft 42 (that is the sun gear 44) is decelerated through the planetary gears 54 and transmitted to the ring gear 46, so that the ring gear 46 gradually starts rotating in the forward direction. However, when the window glass does not reach the position 4 mm below the upper stop position, the protruding section 52 is greatly separated from the protrusion 40, so that the moving contact 50 is away from each pair of the fixed contacts 60A and 61A and fixed contacts 60B and 61B so as to be in a non-conduction state. Thus, the rotation position of the shaft 20 (the fact that the window glass does not reach the position 4 mm below the upper stop position) is detected. In this case (NO), with the motor 10 being actuated, the process moves onto a step 206, and it is detected whether or not the window catches something based on a change of the pulse signal generated from the conduction portion 194 and the sliding contact 196 with the rotation of the pulse plate 192. When the step 206 detects that something is caught (YES), the motor 10 is rotated in the reverse direction at a step 208, so that the window glass descends. On the other hand, when the step 206 determines that nothing is caught (NO), the process returns to the step 204.

When the window glass reaches the position 4 mm below the upper stop position (YES), the protruding section 52 reaches a specified position displaced from the rotation angle where the protruding section 52 contacts the protrusion 40. Further, at this point, the moving contacts 50A and 50B contact together the fixed contacts 60A and 60B, and thus the rotation position (the fact that the window glass reaches the position 4 mm below the upper stop position) of the shaft 20 is detected (YES) at step 204.

The process moves to step 210 to determine whether or not the window glass is fully closed based on the pulse signals produced by the rotation of the pulse plate 192 and the lock current of the motor 10. When the full closure of the window glass is detected, the motor 10 is stopped at a step 212 and the process is completed.

Thus, in the position detector 30, by the moving contacts 50A and 50B rotating together with the ring gear 46 and each pair of fixed contacts 60A and 61A and fixed contacts 60B and 61B, the rotation position of the shaft 20, that is, the position of the window glass (whether or not it reaches the position 4 mm below the upper stop position) can be accurately detected.

Further, in the position detector 30, by sufficiently rotating the shaft 20 of the motor 10 in the forward direction once at the time of installing in the vehicle, it can be automatically set to an initial state in which the moving contacts 50A and 50B contact the fixed contacts 60A and 60B.

That is, when the shaft 20 of the motor 10 is sufficiently rotated in the forward direction once at the time of assembling to the vehicle, the protruding section 52 of the flange portion 48 of the ring gear 46 contacts the protrusion 40 so that any further rotation of the ring gear 46 in the forward direction is stopped. When the shaft 20 further rotates under this condition, the rotation force of the sun gear 44 surpassing the pressing force (a holding force) acts, and the spring washer 58 cancels the holding of the carrier 56 so that the revolution of the planetary gears 54 can be performed. That is, because the spring washer 58 can shut off the transmission of the rotation force in the forward direction from the sun gear 44 (the shaft 20) to the ring gear 46 after the protruding section 52 of the flange portion contacts the protrusion 40, the rotation of the ring gear 46 is stopped. When the sun gear 44 (the shaft 20) rotates in the forward direction (the direction in which the ring gear 46 is to move in the forward direction) in this case wherein the protruding section 52 contacts the protrusion 40, only the planetary gears 54 revolve. Thus, after the protruding section 52 contacts the protrusion 40 and the moving contacts 50A and 50B contact the fixed contacts 60A and 60B, the ring gear 46 does not move even if the shaft 20 of the motor 10 rotates in the forward direction, and the contact state between the moving contacts 50A and 50B and the fixed contacts 60A and 60B is maintained. That is, by sufficiently rotating the shaft 20 of the motor in the forward direction once, it is automatically set to the initial state in which the protruding section 52 contacts the protrusion 40 and the moving contacts 50A and 50B contact the fixed contacts 60A and 60B.

That is, in the position detector 30, because the position being away from the fully closed position of the window glass (upper maximum moving limit) with a specified distance (4 mm in this embodiment) can be mechanically stored regardless of whether or not the window glass reaches the fully closed position (upper maximum moving limit), the move control of the window glass can be accurately performed without fail. For example, in the case that position detector detects the rotation number of the armature of the motor so that the move position of the window glass is detected and resets with the fully-closed position of the window glass as the reference, if the window glass stops before reaching the actual upper maximum moving limit by reasons such as a lowered power supply voltage, an increased friction between the window glass and the window frame or the like, the unit resets with this false stop position as the fully-closed position of the window glass. Thus, in this case, errors become extremely large because the drive control of the motor is carried out with the false fully-closed position of the window glass as the reference. On the other hand, in the position detector 30 of the present invention, even if the window glass stops before reaching the actual fully-closed position (upper maximum moving limit), it is accurately detected when the window glass later passes the position 4 mm away from the fully closed position, so that the move control of the window glass can be accurately carried out without fail. Particularly, in wire-type window regulators, errors of the move position control caused by a wire distortion are large. However, by using the position detector 30, errors due to the wire distortion can be absorbed so that a precise control can be performed.

Thus, by sufficiently rotating the shaft 20 of the motor 10 in the forward direction once at the time of installing in the vehicle, the position detector 30 is automatically set to the initial state in which the protruding section 52 contacts the protrusion 45 and the moving contacts 50A and 50B contact the fixed contacts 60A and 60B. Thus, the initial position can be easily set without cumbersome positional adjustment in assembling work and the cumbersome resetting after the assembling work, and further, the move control of the window glass can be accurately performed without fail.

Further, in the position detector 30 of the first embodiment, with the rotation of the pulse plate 192, the output contact 196B repeats the contact/non-contact to the second conduction portion 194B of the conduction portion 194 so that the pulse signal is detected. Thus, by the detected pulse signal, the rotation speed of the shaft 20 of the motor 10 can be detected linearly.

Thus, when the position detector 30 is used in the power window device for a vehicle having a catch prevention function, for example, the move position and the move speed of the window glass can be constantly detected and controlled linearly.

Further, when the position detector 30 is assembled, the cover plate 36 is disposed first at the bottom and the other parts are disposed onto the cover plate in order. The spring washer 58 (biasing means) constituting the clutch mechanism is beforehand attached integrally onto the carrier 56. That is, the spring washer 58 constituting the clutch mechanism and the carrier 56 rotatably holding the planetary gears 54 can be assembled together as one part. Thus, when the planetary gear train unit and the clutch mechanism are temporarily assembled, the center portions of the spring washer 58 and the carrier 56 are overlapped each other, so that the axis of the spring washer 58 cannot displace or misalign from that of the carrier 56. Thus, a special position determination is not necessary when the spring washer 58 is assembled, the assembling performance is largely improved, and an accurate clutch holding force can be obtained.

In the first embodiment, the position detector 30 is directly applied in the motor 10 for the power window device. However, the position detector 30 is not limited to this direct application, and can be applied in the other mechanisms and positions. For example, the position detector 30 may be installed at a rotation shaft such as an X-arm type rotation support shaft of the window regulator. Further, the position detector 30 may be installed at a wire-wound pulley of a wire type window regulator. Even in these cases, the position of the window glass can be detected accurately and the move control can be performed accurately, further, the initial position can be set easily without cumbersome positional adjustment in the assembling work and cumbersome resetting after the assembling work.

Figure 9:
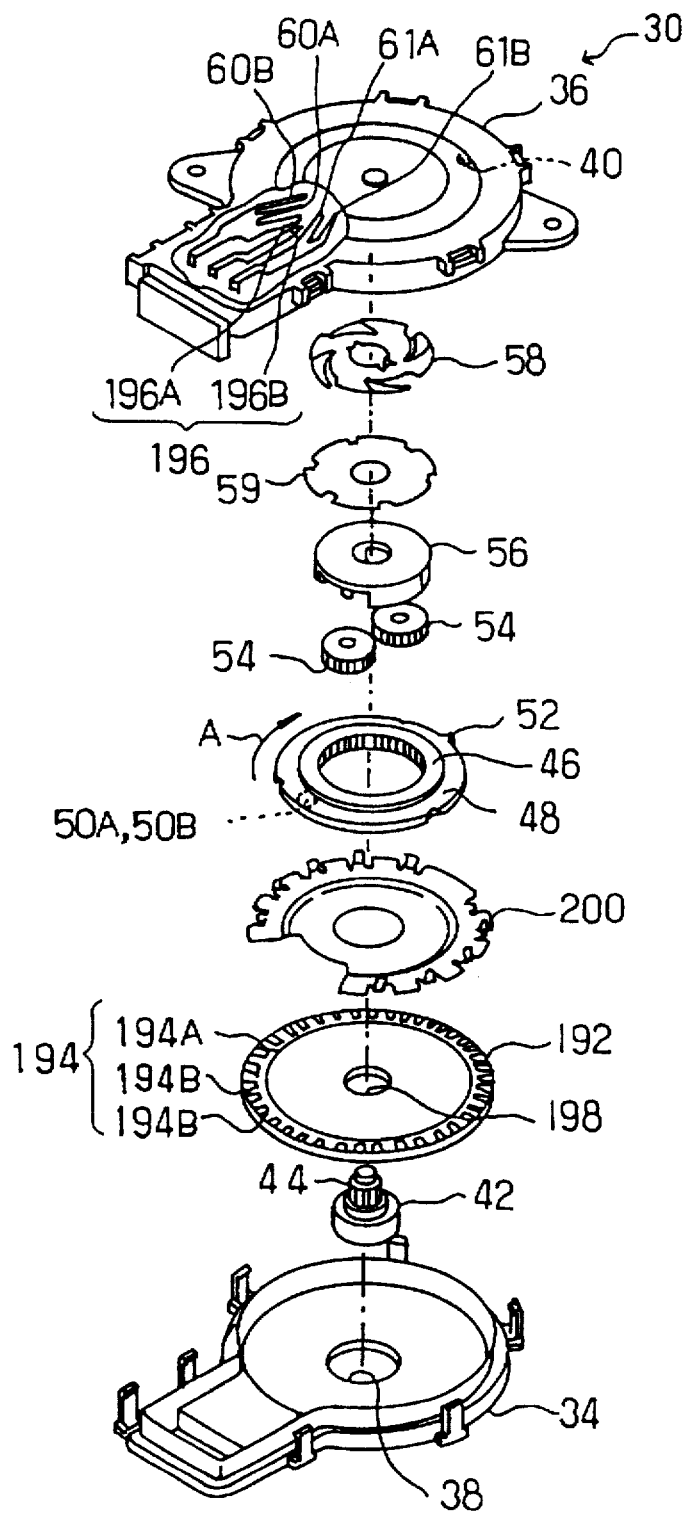
FIG. 9 is a perspective view of a position detector in a disassembled condition according to the second embodiment of the present invention.

Second embodiment of the present invention will be described next with reference to FIG. 9. Parts used in this embodiment are basically identical to the ones in the first embodiment and have the same reference numerals so that the description thereof will be omitted.

The position detector 30 is basically similar to the position detector of the first embodiment. However, the spring washer 58 is attached on the cover plate 36 and the washer 59 is attached to the carrier 56. In the position detector 30, because the spring washer 58 is beforehand attached onto the cover plate 36 in the assembling work, the position of the spring washer 58 can be accurately determined.

In the position detector 30, because the spring washer 58 is beforehand attached onto a fixed position of the cover plate 36, the installation position of the spring washer 58 does not misalign from the rotation center of the carrier 56. Thus, the spring washer 58 can press uniformly in the shaft direction including the rotation shaft of the carrier 56 so that the original function can be accurately maintained.

As described above, the present invention can accurately detect the position of the moving body for a power window device, a sun roof device or the like. The initial position can be set easily without cumbersome positional adjustment, and the present invention can be realized by a simple mechanism and in low cost. Further, the assembling performance is largely improved, and the holding force of the clutch can be accurately obtained.

The present invention having been described hereinabove should not be limited to the disclosed embodiments but may be implemented in other ways without departing from the scope and spirit of the present invention.

What is claimed is:

1. A position detector for a moving body for detecting a specified move position of a moving body in forward and reverse directions, said detector comprising:

a cover plate;

a planetary gear train unit including a ring gear rotatably held in said cover plate and planetary gears engaged with said ring gear, said unit being operatively linked with said moving body through a moving force transmitted from said moving body when said moving body moves;

a switch portion including a moving contact formed integrally with said ring gear for rotating together with said ring gear and a fixed contact fixed in said cover plate and formed to contact said moving contact, said switch portion being for detecting a specified move position of said moving body through operation of contacts that turn ON and OFF; and a clutch mechanism operatively linked to said planetary gear train unit to stop a revolution of said planetary gears until said switch portion is actuated so that said moving force of said moving body is transmitted from said planetary gears to said ring gear to rotate said ring gear and, to shut off transmission of said moving force in a forward direction from said moving body to said ring gear by the revolution of said planetary gears after said switch portion is actuated, wherein:

said clutch mechanism includes a biasing device and said planetary gears is rotatably held in a carrier; and said biasing device and said carrier are assembled integrally with each other.

2. A position detector for a moving body according to claim 1, wherein:

said biasing device has an insertion protrusion; and said carrier has an insertion hole so that said insertion protrusion is inserted thereinto.

3. A position detector for a moving body according to claim 1, wherein:

said carrier has an insertion protrusion; and said biasing device has an insertion hole so that said insertion protrusion is inserted thereinto.

4. A position detector for a moving body according to claim 1, wherein:

said planetary gears are assembled integrally with said carrier.

5. A position detector for a moving body according to claim 1, further comprising:

pulse generating means for generating pulse following the actuation of said planetary gear train unit; and pulse detection means for detecting the pulses generated by said pulse generation means.

6. A position detector for a moving body according to claim 1, wherein:

said switch portion includes a first protrusion formed on said cover plate and a second protrusion which is formed on said ring gear and is engagable with said first protrusion.

7. A position detector for a moving body for detecting a specified move position of a moving body in forward and reverse directions, said detector comprising:

a cover plate;

a planetary gear train unit including a ring gear rotatably held in said cover plate and planetary gears engaged with said ring gear, said unit being operatively linked with said moving body through a moving force transmitted from said moving body when said moving body moves;

a switch portion including a moving contact formed integrally with said ring gear for rotating together with said ring gear and a fixed contact fixed in said cover plate and formed to contact said moving contact, said switch portion being for detecting a specified move position of said moving body through operation of contacts that turn ON and OFF; and a clutch mechanism operatively linked to said planetary gear train unit to stop a revolution of said planetary gears until said switch portion is actuated so that said moving force of said moving body is transmitted from said planetary gears to said ring gear to rotate said ring gear and, to shut off transmission of said moving force in a forward direction from said moving body to said ring gear by the revolution of said planetary gears after said switch portion is actuated, wherein:

said clutch mechanism includes a biasing device; and said biasing device and said cover plate are assembled integrally with each other.

8. A position detector for a moving body according to claim 7, further comprising:

pulse generating means for generating pulse following the actuation of said planetary gear train unit; and pulse detection means for detecting the pulses generated by said pulse generation means.

9. A position detector for a moving body according to claim 7, wherein:

said switch portion includes a first protrusion formed on said cover plate and a second protrusion which is formed on said ring gear and is engagable with said first protrusion.

* * * * *